United States Patent
Abarra et al.

(10) Patent No.: US 6,828,047 B2
(45) Date of Patent: Dec. 7, 2004

(54) MAGNETIC RECORDING MEDIUM AND MAGNETIC STORAGE APPARATUS

(75) Inventors: E. Noel Abarra, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/400,891

(22) Filed: Mar. 27, 2003

(65) Prior Publication Data

US 2003/0186086 A1 Oct. 2, 2003

Related U.S. Application Data

(63) Continuation of application No. 09/849,835, filed on May 4, 2001, now Pat. No. 6,562,489, which is a continuation-in-part of application No. 09/584,603, filed on May 31, 2000, now Pat. No. 6,613,460.

(30) Foreign Application Priority Data

Nov. 12, 1999  (JP) ........................................... 11-322961
Apr. 6, 2001   (JP) ....................................... 2001-109006

(51) Int. Cl.$^7$ .............................. G11B 5/66; G11B 5/70
(52) U.S. Cl. ........................ 428/694 TS; 428/694 TM; 428/900
(58) Field of Search ............... 428/694 TS, 694 TM, 428/900

(56) References Cited

U.S. PATENT DOCUMENTS 5,736,262 A    4/1998  Ohkijima et al. ........... 428/611
5,851,643 A  * 12/1998  Honda et al. ............... 428/212
6,204,995 B1   3/2001  Hokkyo et al. .......... 360/97.01
6,248,416 B1   6/2001  Lambeth et al. ........... 428/65.3
6,428,906 B1   8/2002  Wong et al. ................ 428/611
6,562,489 B2 *  5/2003  Abarra et al. .......... 428/694 TS

FOREIGN PATENT DOCUMENTS

| JP | 3-193851 | 8/1991 |
| JP | 4-105213 | 4/1992 |
| JP | 4-291017 | 10/1992 |
| WO | 96/27187 | 9/1996 |

OTHER PUBLICATIONS

Schneibel, J.H. et al.; "Bend ductility, creep strength, and physical properties of extruded chromium–modified titanium aluminide (A13Ti)"; *Mater. Sci. Eng.*, A (1992), A152(1–2), 126–31.

* cited by examiner

Primary Examiner—Holly Rickman
(74) Attorney, Agent, or Firm—Greer, Burns & Crain, Ltd.

(57) ABSTRACT

A magnetic recording medium is constructed to include a substrate, a magnetic layer made of a Co or Co-based alloy, and an underlayer disposed between the substrate and the magnetic layer. The underlayer is made of an ordered intermetallic material of FCC $L1_2$ or FCT $L1_0$ crystalline structure, so that c-axis of the magnetic layer is aligned in a predetermined direction.

13 Claims, 15 Drawing Sheets

FIG.3

| $A_3B$ ALLOY | PARAMETER a (Å) | % MISMATCH FROM 4.1 Å |
|---|---|---|
| $Al_5CuHf_2$ | 4.013 | 2 % |
| $Al_5CuTi_2$ | 3.927 | 4 |
| $Al_5CuZr_2$ | 4.04 | 1.5 |
| $Al_{30}Dy_7Hf_3$ | 4.19 | 2 |
| $Al_{30}Dy_7Zr_3$ | 4.2 | 2 |
| $Al_3Er$ | 4.215 | 2.8 |
| $Al_{15}HfHo_4$ | 4.2 | 2 |
| $Al_{60}Hf_7Tb_{13}$ | 4.2 | 2 |
| $Al_5NiNb_2$ | 4.03 | 1.7 |
| $Al_5NiZr_2$ | 4.06 | 1 |

MAGNETIC RECORDING MEDIUM AND MAGNETIC STORAGE APPARATUS

This application is a Continuation of patent application Ser. No. 09/849,835 filed May 4, 2001, now issued U.S. Pat. No. 6,562,489, which is a Continuation-In-Part Application of a U.S. patent application Ser. No. 09/584,603 filed May 31, 2000 now issued U.S. Pat. No. 6,613,460.

BACKGROUND OF THE INVENTION

This application claims the benefit of Japanese Patent Applications No. 11-322961 filed Nov. 12, 1999 and No. 2001-109006 filed Apr. 6, 2001, in the Japanese Patent Office, the disclosures of which are hereby incorporated by reference.

1. Field of the Invention

The present invention generally relates to magnetic recording media and magnetic storage apparatuses, and more particularly to a magnetic recording medium and a magnetic storage apparatus which are suited for high-density longitudinal magnetic recording.

2. Description of the Related Art

The recording density of longitudinal magnetic recording media, such as magnetic disks, has been increased considerably, due to the reduction of medium noise and the development of magnetoresistive and high-sensitivity spin-valve heads. A typical longitudinal magnetic recording medium is comprised of a substrate, a seed layer, an underlayer, a magnetic layer where information is written, a C or a Diamond-Like C (DLC) overlayer, and an organic lubricant layer which are successively stacked in this order. For example, the underlayer is made of Cr or a Cr-based alloy, and the magnetic layer is made of a CoCr-based alloy.

The medium noise is reduced by decreasing the exchange coupling between grains, by promoting more Cr segregation in the CoCr-based alloy which forms the magnetic layer. Lowering the medium noise also involves decreasing the grain size and grain size distribution of the magnetic layer, for example, by reducing the thickness of the underlayer. Underlayers which are made of materials such as CrMo, CrTiB, NiAl or the like are presently used in longitudinal magnetic recording media.

The underlayer described above also promotes crystallographic axis (c-axis or magnetic anisotropy axis) orientation in a plane which increases remanence magnetization and thermal stability of bits on the magnetic layer. Much success has been realized with an underlayer having a B2 crystal structure, such as NiAl and FeAl which have the (211) texture when deposited on a glass substrate.

However, the (211) texture is weak for the underlayer having the B2 crystal structure, including NiAl and FeAl. For this reason, it is necessary to increase the thickness of the underlayer in order to improve the (211) texture and to obtain a sufficiently high medium coercivity, as compared to a case where a Cr-based alloy is formed on a NiP layer. As a result, there are limitations in controlling the grain size and the grain size distribution of the magnetic layer by way of reducing the thickness of the underlayer, and that it is difficult to further improve the signal-to-noise ratio (SNR) of the longitudinal magnetic recording medium.

On the other hand, perpendicular magnetic recording media holds promise for high-density recording due to thermal stability of high-density bits. Compared to longitudinal magnetic recording media, the perpendicular magnetic recording media have favorable demagnetizing fields for high linear densities.

A typical perpendicular magnetic recording medium includes a substrate which is usually made of a glass ceramic, a seed layer made of CoCr or Ti, and a magnetic layer made of a Co-based alloy where information is written, an overlayer made of C or Diamond-Like C (DLC), and an organic lubricant layer on the overlayer.

Another typical perpendicular magnetic recording medium has a double magnetic layer structure made up of a soft magnetic layer under the Co-based magnetic layer. The soft magnetic layer is usually made of a NiFe or FeSiAl.

As in the case of the longitudinal magnetic recording medium, the medium noise of the perpendicular magnetic recording medium is reduced by decreasing the exchange coupling between grains, by promoting more Cr segregation in a Co-based alloy which forms the magnetic layer. Lowering the medium noise also involves reducing the grain size and grain size distribution of the magnetic layer, and the proper use of the seed layer which is made of the material such as CoCr and Ti to promote a (0002) growth for the magnetic layer.

However, the conventional perpendicular magnetic recording media do not have a means of controlling or considerably reducing the grain size and grain size distribution of the magnetic layer, and there is a problem in that it is difficult to greatly improve the medium signal-to-noise ratio (SNR).

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium comprising a substrate, a magnetic layer made of a Co or Co-based alloy, and an underlayer disposed between the substrate and the magnetic layer, where the underlayer is made of an ordered intermetallic material of FCC $L1_2$ or FCT $L1_0$ crystalline structure, so that c-axis of the magnetic layer is aligned in a predetermined direction. According to the magnetic recording medium of the present invention, it is possible to simultaneously improve the texture of the underlayer and control the grain size and the grain size distribution of the magnetic layer, to thereby enable further improvement of the SNR of the magnetic recording medium. The predetermined direction may be substantially parallel to or substantially perpendicular to an in-plane direction of the magnetic layer, so as to obtain a longitudinal magnetic recording medium or a perpendicular magnetic recording medium.

Still another object of the present invention is to provide a method of producing a magnetic recording medium which includes a base layer, a magnetic layer made of Co or a Co-based alloy, and an underlayer disposed between the base layer and the magnetic layer, comprising the step of depositing the underlayer which is made of a (111)-textured ordered intermetallic material of FCC $L1_2$ crystalline structure or FCT $L1_0$ crystalline structure on the base layer which is made of glass or oxidized NiP, at a deposition temperature of approximately 140 to approximately 180° C. According to the method of producing the magnetic recording medium of the present invention, it is possible to simultaneously improve the texture of the underlayer and control the grain size and the grain size distribution of the magnetic layer, to thereby enable further improvement of the SNR of the magnetic recording medium.

A further object of the present invention is to provide a magnetic storage apparatus comprising a head, and at least one magnetic recording medium which includes a substrate, a magnetic layer made of Co or a Co-based alloy, and an underlayer disposed between the substrate and the magnetic layer, where the underlayer is made of an ordered intermetallic material of FCC $L1_2$ crystalline structure or FCT $L1_0$ crystalline structure on the substrate, so that c-axis of the magnetic layer is aligned in a predetermined direction. According to the magnetic storage apparatus of the present invention, it is possible to simultaneously improve the texture of the underlayer and control the grain size and the grain size distribution of the magnetic layer, to thereby enable further improvement of the SNR of the magnetic recording medium, so that a high-quality high-density recording and reproduction can be achieved. In addition, the predetermined direction may be substantially parallel to or substantially perpendicular to an in-plane direction of the magnetic layer, so as to realize a longitudinal magnetic recording and reproduction or a perpendicular magnetic recording and reproduction.

Other objects and further features of the present invention will be apparent from the following detailed description when read in conjunction with the accompanying drawings.

BRIEF DESCRIPTION OF THE DRAWINGS

FIG. 3 is a diagram showing the lattice parameters a and the % mismatch from 4.1 Å, for various Al-based alloys having the $L1_2$ crystalline structure;

DESCRIPTION OF THE PREFERRED EMBODIMENTS

Embodiments of a magnetic recording medium according to the present invention, a magnetic storage apparatus according to the present invention and a method of producing a magnetic recording medium according to the present invention, will now be described with reference to the accompanying drawings.

Figure 1:
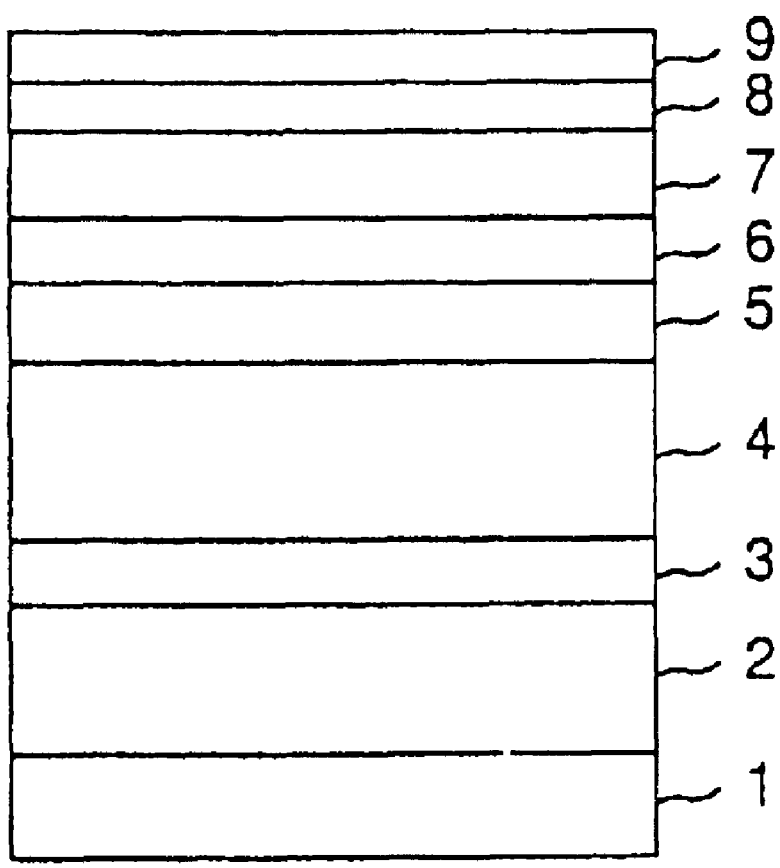
FIG. 1 is a cross sectional view showing an important part of a first embodiment of a magnetic recording medium according to the present invention.

FIG. 1 is a cross sectional view showing an important part of a first embodiment of a magnetic recording medium according to the present invention. In this embodiment, the present invention is applied to a longitudinal magnetic recording medium.

The magnetic recording medium shown in FIG. 1 includes a substrate 1 made of Al or glass ceramic, a NiP layer 2, a seed layer 3, an underlayer 4, an intermediate layer 5 made of a Cr-based alloy, a CoCr-based alloy layer 6, a magnetic layer 7 made of Co or a Co-based alloy such as a CoCr-based alloy, a C or DLC overlayer 8, and an organic lubricant layer 9 which are successively stacked in the order shown.

The NiP layer 2 is preferably oxidized and/or mechanically textured. When oxidized, NiP forms a good base for the growth of Cr (002) texture. NiP is hard and is essential for tribology purposes. The NiP can also be textured which improves the medium orientation ratio while reducing head slider stiction.

The seed layer 3 is provided to promote adhesion and/or crystallographic texture of the underlayer 4 formed thereon. The seed layer 3 is made of a Cr-based alloy including a material selected from a group of Mo, Ti, V and W. Cr-rich alloys with the BCC crystal structure tend to grow a (002) texture on oxidized NiP. Hence, the provision of the Cr-rich seed layer 3 promotes an in-plane orientation (1120) for the magnetic layer 7 which is made of the CoCr-based alloy, for example.

The underlayer 4 is comprised of an ordered intermetallic material of Face-Centered Cubic (FCC) $L1_2$ or Face-Centered-Tetragonal(FCT) $L1_0$ crystalline structure, with a thickness of 3 to 100 nm, so as to promote formation of small grain sizes and reduced grain size distribution in the magnetic layer 7.

The underlayer 4 comprised of the $L1_2$ crystalline structure material may be $Al_5CuZr_2$, $AlCuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$. Such materials used for the underlayer 4 have the proper crystal structure and lattice parameter to promote epitaxy with the magnetic layer 7, since Co c-parameter is 0.406 nm.

On the other hand, the underlayer 4 comprised of the $L1_0$ crystalline structure may be γ-TiAl. This material γ-TiAl used for the underlayer 4 has the proper crystal structure and lattice parameter to promote epitaxy with the magnetic layer 7. Because γ-TiAl is FCT, this material grows a (001) texture which enhances the c-axis of the magnetic layer 7 to be in-plane. In this case, the underlayer 4 may be made slightly Al-rich so that the Al content is 51 to 55 at. %. The presence of too much twinning may reduce the magnetic coercivity of the magnetic layer 7. However, this slightly Al-rich composition range of the underlayer 4 reduces twinning which is very common for FCC materials.

In either case where the underlayer 4 is comprised of the $L1_2$ or $L1_0$ crystalline structure, the underlayer 4 may be alloyed with at least one element selected from a group of B, Cr, Hf, Mo, Mn, Ta, Ti, V, Zr or alloys thereof. In this case, it becomes possible to promote smaller grain sizes and to reduce stress due to better lattice matching in the magnetic layer 7 by the alloying of such elements.

Furthermore, the underlayer 4 may be made essentially of tetragonal $Al_3Ti$ which is alloyed with an element selected from a group of Ni, Cu, Cr, Mn, Zn, Fe, Co, Ag, Pd, Pt, Au and Rh which make the $L1_0$ crystalline structure into the $L1_2$ crystalline structure. Alloying the tetragonal $Al_3Ti$ with the above elements transforms the $L1_0$ crystalline structure into the $L1_2$ crystalline structure, which makes the crystallographic planes such as (100), (010) and (001) have similar dimensions which provide a more uniform lattice for the magnetic layer 7 to grow on or for the intermediate layer 5 to grow on.

In this embodiment, the underlayer 4 has a lattice parameter a which satisfies 3.9 Å≦a≦4.3 Å. This range of the lattice parameter a matches that of the magnetic layer 7, to better promote epitaxy.

The intermediate layer 5 is made of a Cr—M alloy having a BCC crystal structure with a thickness of 1 to 30 nm, where M is an element selected from a group of B, Mn, Mo, Ti, V and W. Such materials used for the intermediate layer 5 has the proper lattice parameter to promote epitaxy with the magnetic layer 7. In addition, Cr adheres very well to various kinds of materials such that the Cr—M alloy makes a good buffer layer between the underlayer 4 and the magnetic layer 7.

The CoCr-based alloy layer 6 has a HCP crystal structure with a thickness of 1 to 10 nm, and is used to promote epitaxy and to narrow the grain size distribution of the magnetic layer 7. When a CoCr-based alloy magnetic layer having the HCP crystal structure is grown directly on a Cr-based layer having the BCC crystal structure, a portion of the magnetic layer in contact with this Cr-based layer having the BCC crystal structure is adversely affected due to the lattice mismatch and/or Cr diffusion. In this case, the magnetic anisotropy as well as the total magnetization of the magnetic layer are reduced. On the other hand, the use of the non-magnetic CoCr-based alloy layer 6 having the HCP crystal structure prevents such undesirable effects on the magnetic layer 7. As a result, this embodiment can increase the magnetic anisotropy and the coercivity of the magnetic layer 7, and also improve the in-plane orientation. The full magnetization of the magnetic layer 7 is also obtainable and the so-called "dead layer" portion is minimized. Moreover, the formation of smaller grains at the interface portion of the magnetic layer 7 is reduced.

The magnetic layer 7 may be made of a CoCrPt—X alloy with a thickness of 5 to 30 nm, where X is an element selected from a group of B, Cu, Mo, Ta, W and alloys thereof.

The C or DLC overlayer 8 protects the magnetic recording medium when in contact with a head. This overlayer 8 also protects the magnetic layer 7 from corrosion.

Figure 2:
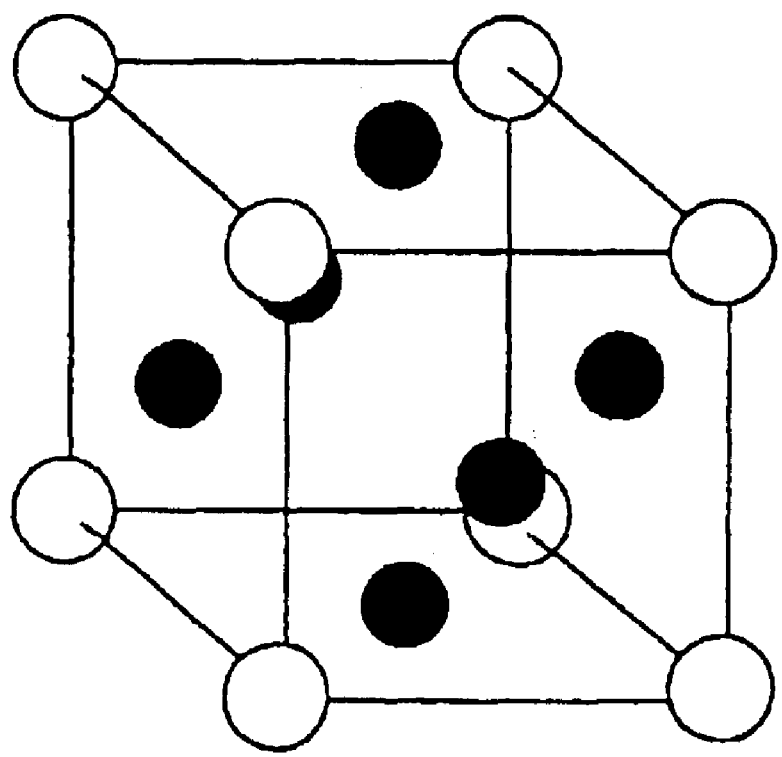
FIG. 2 is a diagram showing an ordered FCC $L1_2$ crystalline structure which may be used for the underlayer.

FIG. 2 shows an ordered FCC $L1_2$ crystalline structure which may be used for the underlayer 4. For example, the crystalline structure shown in FIG. 2 belongs to $Cu_3Au$ as well as many other alloys. However, in order for the lattice parameter of the underlayer 4 to substantially match that of a Cr or Cr-based magnetic layer having the HCP crystal structure, the lattice parameter of the underlayer 4 has to be approximately 4.1 Å.

Most materials having the $L1_2$ crystalline structure with the proper lattice parameter that will substantially match that of the Cr or Cr-based magnetic layer having the HCP crystal structure are Al-based alloys, as shown in FIG. 3. FIG. 3 shows the lattice parameters a and the % mismatch from 4.1 Å, for various Al-based alloys having the $L1_2$ crystalline structure. The various Al-based alloys having the $L1_2$ crystalline structure include $Al_5CuHf_2$, $Al_5CuTi_2$, $Al_5CuZr_2$, $Al_{30}Dy_7Hf_3$, $Al_{30}Dy_7Zr_3$, $Al_3Er$, $Al_{15}HfHo_4$, $Al_{60}Hf_7Tb_{13}$, $Al_5NiNb_2$, and $Al_5NiZr_2$.

Figure 4:
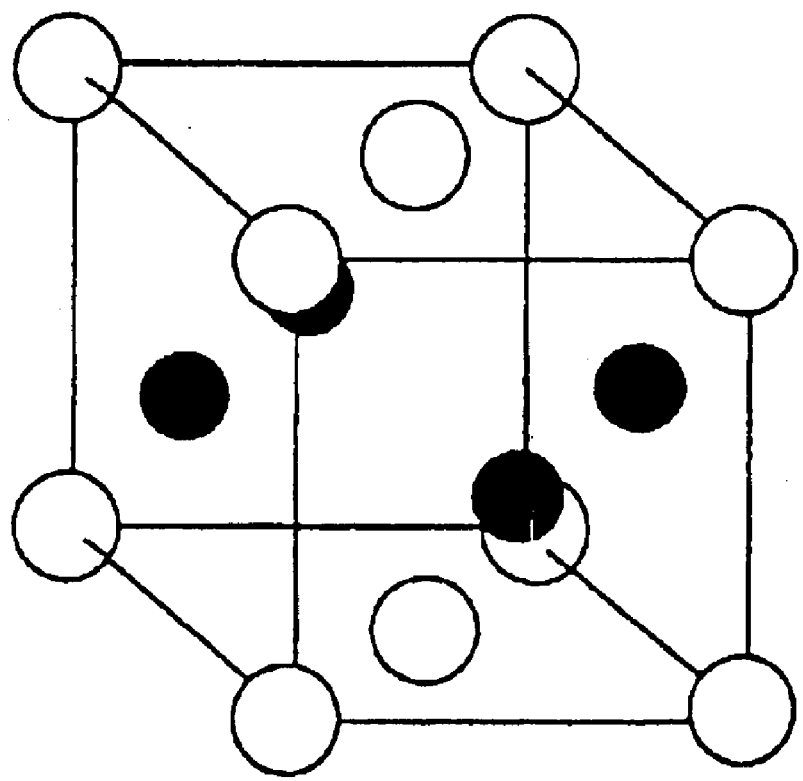
FIG. 4 is a diagram showing an ordered FCT $L1_0$ crystalline structure which may be used for the underlayer.

On the other hand, FIG. 4 shows an ordered FCT $L1_0$ crystalline structure which may be used for the underlayer 4. For example, the crystalline structure shown in FIG. 4 belongs to γ-TiAl. Although γ-TiAl is tetragonal, the lattice parameters a and c are a=0.4005 nm and c=0.407 nm which are not very different from those of the magnetic layer 7, and a ratio a/c is close to 1. Hence, it may be seen that γ-TiAl is suited for use as the underlayer 4. Doping γ-TiAl with other elements affects the electronic structure which reduces tegragonality.

Figure 5:
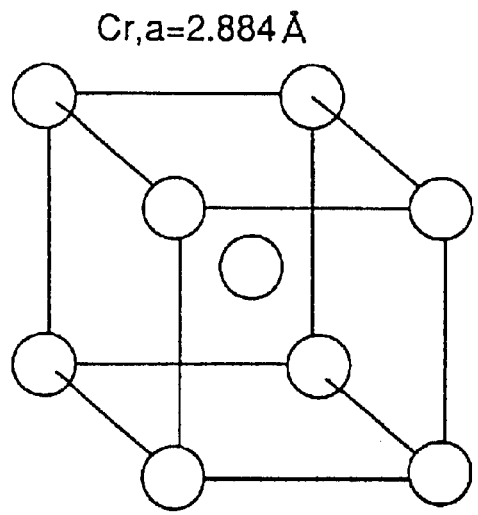
FIG. 5 is a diagram showing a BCC crystal structure of a Cr underlayer with the lattice parameter a of 2.884 Å.
Figure 6:
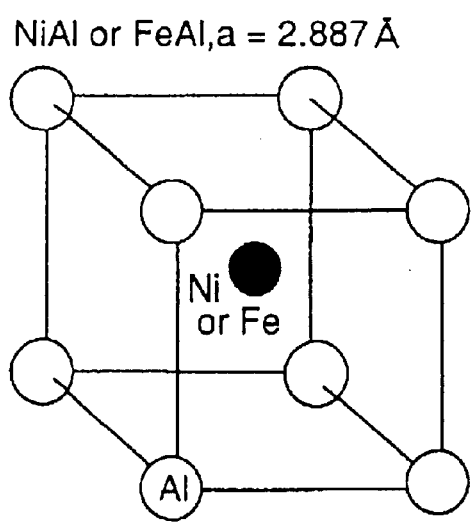
FIG. 6 is a diagram showing a B2 crystal structure of a NiAl or FeAl underlayer the lattice parameter a of 2.887 Å.

For comparison purposes, FIGS. 5 and 6 respectively show a BCC crystal structure of a Cr underlayer with the lattice parameter a of 2.884 Å, and a B2 crystal structure of a NiAl or FeAl underlayer the lattice parameter a of 2.887 Å.

With regard to FIG. 5, the Cr[110] lattice spacing of 4.08 Å matches Co-based magnetic layers such as CoCrPt—M alloys, where M is Ta, Ni, W or B (d(0002)~4.1 Å). Cr is usually alloyed with V, W or Mo to expand the lattice parameter to better match the increasing lattice parameters of Co-based alloys with higher Pt content, for example.

With regard to FIG. 6, NiAl has lattice parameter a which is very close to that of Cr and makes an appropriate underlayer for Co-based magnetic layers having the HCP crystal structure, such as a CoCr-based alloy. NiAl is an ordered intermetallic alloy and tends to form smaller grains when sputter deposited as compared to Cr-based alloys. As a result, NiAl promotes small grain sizes and good grain size distribution for magnetic layers deposited thereon. NiAl grows with a (211) and (110) textures which promote Co(10 10) resulting in the c-axis of the magnetic layer: becoming in-plane. However, the (211) texture is weak, and the presence of the (110) texture results in anisotropy orientations largely out of the plane as compared to Cr(002) which reveals excellent in-plane c-axis orientation. Moreover, NiAl need to be relatively thick in order to obtain a proper coercivity for the magnetic layer.

Therefore, it may be seen that using a Cr underlayer or a NiAl under layer cannot simultaneously achieve (i) excellent in-plane c-axis orientation and (ii) reduced grain size of the magnetic layer, unlike the first embodiment described above.

Figure 7:
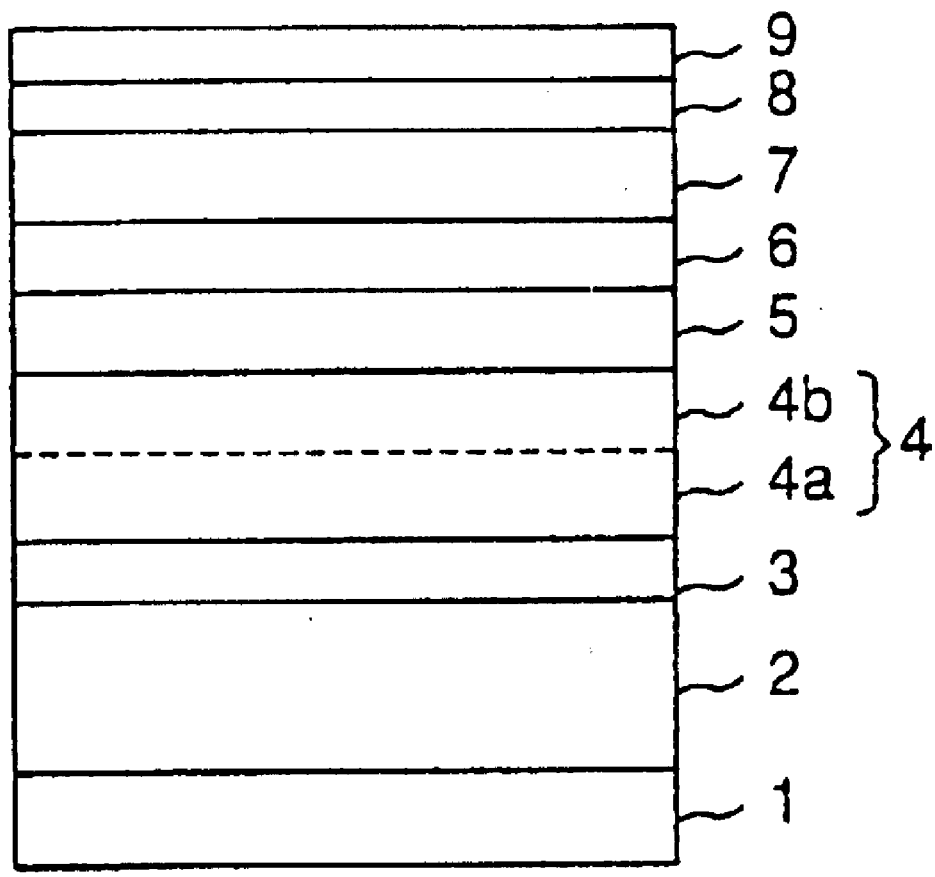
FIG. 7 is a cross sectional view showing an important part of a second embodiment of the magnetic recording medium according to the present invention.

Next, a description will be given of a second embodiment of the magnetic recording medium according to the present invention, by referring to FIG. 7. FIG. 7 is a cross sectional view showing an important part of the second embodiment of the magnetic recording medium. In FIG. 7, those parts which are the same as those corresponding parts in FIG. 1 are designated by the same reference numerals, and a description thereof will be omitted. In this embodiment, the present invention is applied to a longitudinal magnetic recording medium.

In FIG. 7, the underlayer 4 has a multi-layer structure. For the sake of convenience, FIG. 7 shows a case where the underlayer 4 has a bi-layer structure, including a first layer 4a and a second layer 4b. Each of the first and second layers 4a and 4b is comprised of an ordered intermetallic material of FCC $L1_2$ or FCT $L1_0$ crystalline structure, and the same materials used for the underlayer 4 in the first embodiment, including the materials shown in FIG. 3, may be used for each of the first and second layers 4a and 4b.

Some $L1_2$ or $L1_0$ crystalline structures are better suited for controlling grain sizes and texture, while others may show improvement with thickness but do not grow the proper crystallographic texture when directly grown on a particular surface material. Accordingly, the use of the underlayer 4 having the multi-layer structure can more positively and simultaneously achieve excellent in-plane c-axis orientation and reduced grain size of the magnetic layer 7.

Figure 8:
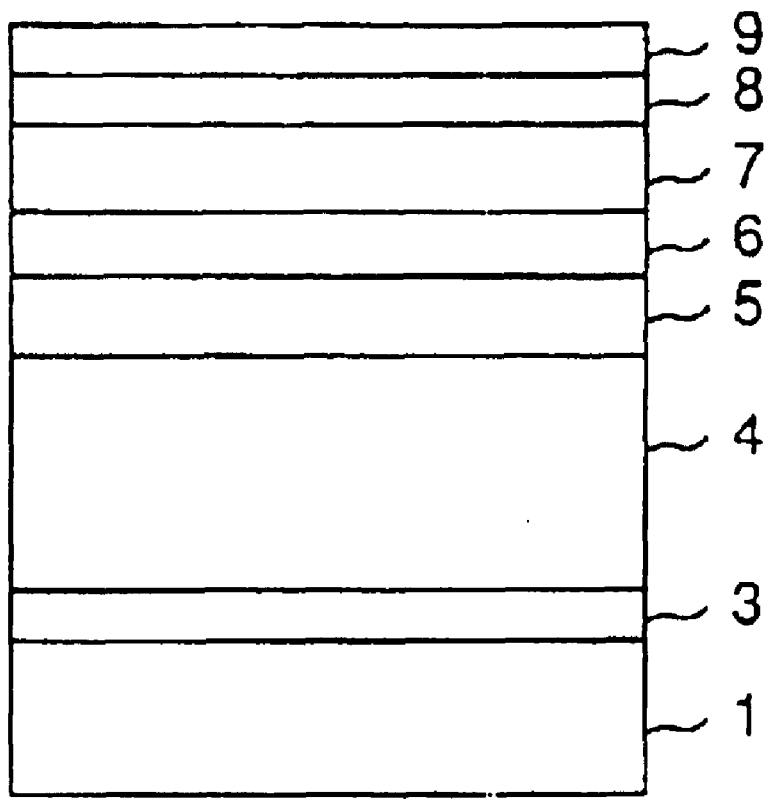
FIG. 8 is a cross sectional view showing an important part of a third embodiment of the magnetic recording medium according to the present invention.

Next, a description will be given of a third embodiment of the magnetic recording medium according to the present invention, by referring to FIG. 8. FIG. 8 is a cross sectional view showing an important part of the third embodiment of the magnetic recording medium. In FIG. 8, those parts which are the same as those corresponding parts in FIG. 1 are designated by the same reference numerals, and a description thereof will be omitted. In this embodiment, the present invention is applied to a longitudinal magnetic recording medium.

In this embodiment, the substrate 1 is made of glass, and a seed layer 3 is formed directly on the substrate 1. This seed layer 3 is made of NiAl or FeAl having a B2 crystal structure. NiAl and FeAl having the B2 crystal structure tend to grow a (211) texture on glass. Accordingly, this embodiment can promote the in-plane orientation ($10\bar{1}0$) for the CoCr-based magnetic layer 7 which has less stress than that with Cr-based underlayers due to lattice matching. Hence, this embodiment is suited for a case where a Co($10\bar{1}0$) orientation is favoured on the glass substrate 1.

Figure 9:
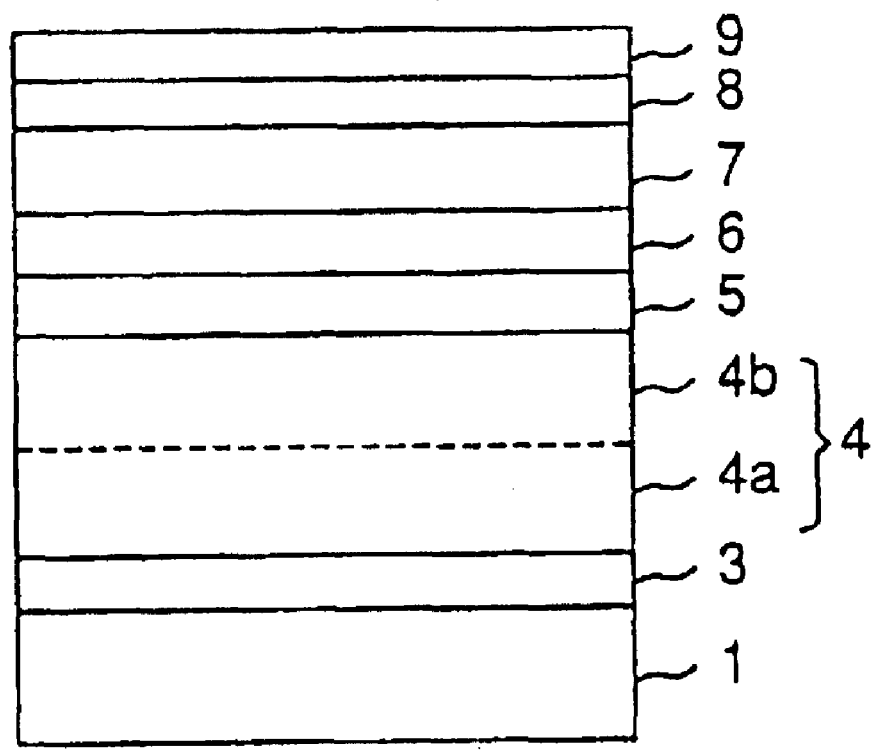
FIG. 9 is a cross sectional view showing an important part of a fourth embodiment of the magnetic recording medium according to the present invention.

Next, a description will be given of a fourth embodiment of the magnetic recording medium according to the present invention, by referring to FIG. 9. FIG. 9 is a cross sectional view showing an important part of the fourth embodiment of the magnetic recording medium. In FIG. 9, those parts which are the same as those corresponding parts in FIG. 7 are designated by the same reference numerals, and a description thereof will be omitted. In this embodiment, the present invention is applied to a longitudinal magnetic recording medium.

In this embodiment, the underlayer 4 of the third embodiment has the bi-layer structure of the second embodiment. In other words, the underlayer 4 is made up of the first and second layers 4a and 4b.

Next, a description will be given of a modification which is applicable to any of the first through fourth embodiments described above.

In this modification, the seed layer 3, which is disposed between the substrate 1 and the magnetic layer 7, is made of an ordered intermetallic material of FCC $L1_2$ or FCT $L1_0$ crystalline structure. In addition, the underlayer 4 is made of Cr—M, NiAl or FeAl, where M is an element selected from a group of B, Mn, Mo, Ti, V and W. Further, a ferromagnetic material selected from a group of CoCrTa, CoCrPt, CoCrPtB, CoCrPtTa, CoCrPtTaB, CoCrPtTaNb and CoCrPtWB and having a thickness of 5 to 30 nm may be used for the magnetic layer 7.

Figure 10:
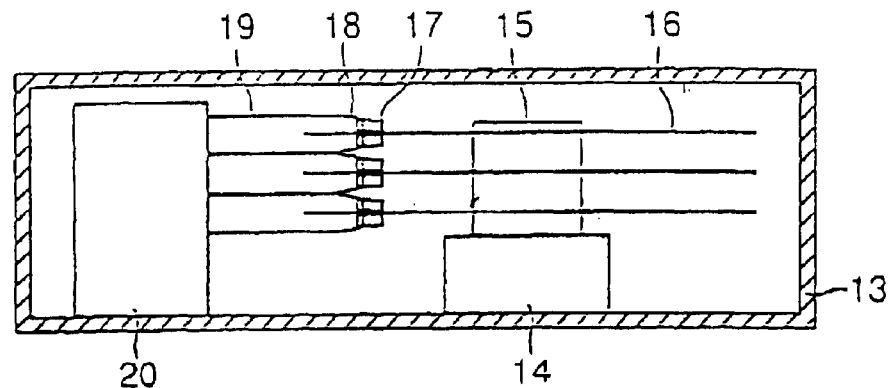
FIG. 10 is a cross sectional view showing an important part of a first embodiment of a magnetic storage apparatus according to the present invention.

Next, a description will be given of a first embodiment of a magnetic storage apparatus according to the present invention, by referring to FIGS. 10 and 11. FIG. 10 is a cross sectional view showing an important part of this first embodiment of the magnetic storage apparatus, and FIG. 11 is a plan view showing the important part of this first embodiment of the magnetic storage apparatus.

Figure 11:
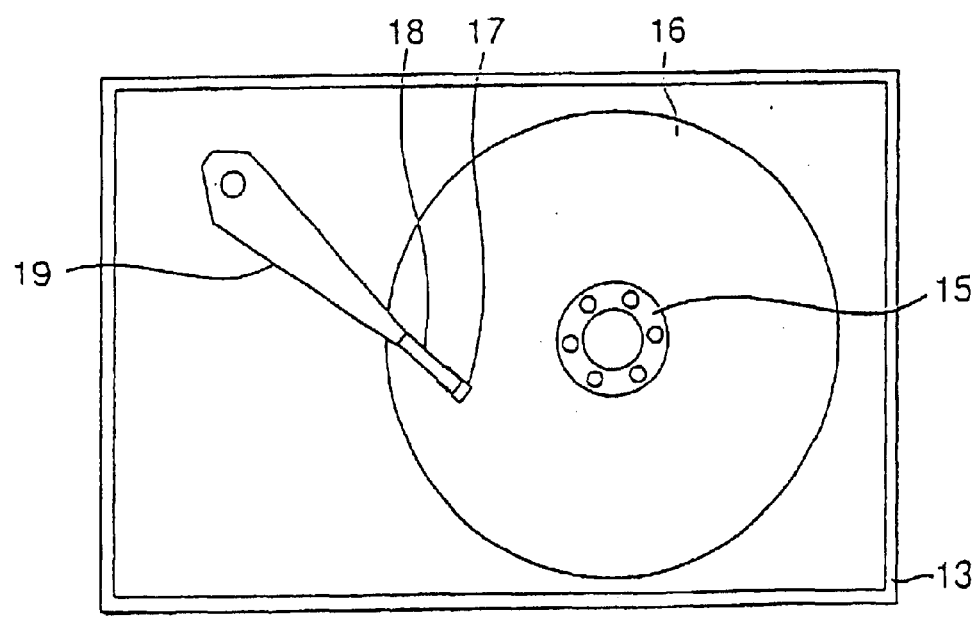
FIG. 11 is a plan view showing the important part of the first embodiment of the magnetic storage apparatus.

As shown in FIGS. 10 and 11, the magnetic storage apparatus generally includes a housing 13. A motor 14, a hub 15, a plurality of magnetic recording media 16, a plurality of recording and reproducing (read and write) heads 17, a plurality of suspensions 18, a plurality of arms 19, and an actuator unit 20 are provided within the housing 13. The magnetic recording media 16 are mounted on the hub 15 which is rotated by the motor 14. The recording and reproducing head 17 is made up of a reproducing head such as a MR or GMR head, and a recording head such as an inductive head. Each recording and reproducing head 17 is mounted on the tip end of a corresponding arm 19 via the suspension 18. The arms 19 are moved by the actuator unit 20. The basic construction of this magnetic storage apparatus is known, and a detailed description thereof will be omitted in this specification.

This embodiment of the magnetic storage apparatus is characterized by the magnetic recording media 16. Each magnetic recording medium 16 has the structure of any of the first through fourth embodiments of the magnetic recording medium described above in conjunction with FIGS. 1 through 9, or the modification thereof. Of course, the number of magnetic recording media 16 is not limited to three, and only one, two or four or more magnetic recording media 16 may be provided.

The basic construction of the magnetic storage apparatus is not limited to that shown in FIGS. 10 and 11. In addition, the longitudinal magnetic recording medium used in the present invention is not limited to a magnetic disk.

Figure 12:
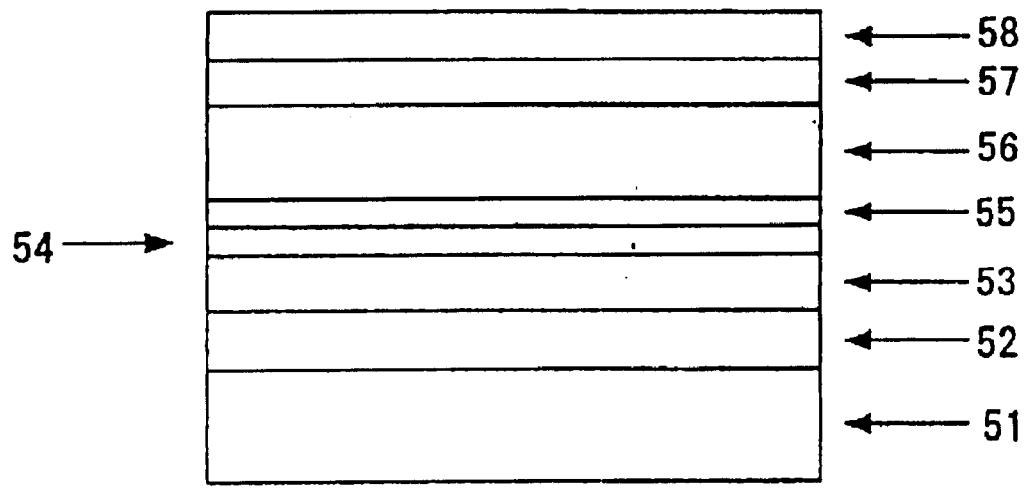
FIG. 12 is a cross sectional view showing an important part of a fifth embodiment of the magnetic recording medium according to the present invention.

FIG. 12 is a cross sectional view showing an important part of a fifth embodiment of the magnetic recording medium according to the present invention. In this fifth embodiment, the present invention is applied to a perpendicular magnetic recording medium. This fifth embodiment of the magnetic recording medium is produced by a first embodiment of the method of producing the magnetic recording medium according to the present invention.

The magnetic recording medium shown in FIG. 12 includes a substrate 51 made of Al, a glass ceramic or the like, a seed layer 52 made of NiP or the like, an underlayer 53 made of a (111)-textured ordered intermetallic material of Face-Centered Cubic (FCC) $L1_2$ crystalline structure or Face-Centered-Tegragonal (FCT) $L1_0$ crystalline structure, an adhesive layer 54 made of a Cr-based alloy or the like, an intermediate layer 55 made of a CoCr-based alloy or the like having a HCP crystal structure, a magnetic layer 56 made of Co or a Co-based alloy, a protective layer 57 made of C, DLC or the like, and a lubricant layer 58 made of an organic lubricant or the like.

The NiP seed layer 52 may be oxidized by exposure to air or by in Situ $O_2$ gas introduction into a sputtering chamber before deposition of the underlayer 53. On the other hand, for some substrates it is not essential to provide the seed layer 52, and the seed layer 52 may be omitted.

The underlayer 53 is made of the (111)-textured FCC $L1_2$ crystalline structure or the FCT $L1_0$ crystalline structure, so as to promote formation of small grain sizes and reduced grain size distribution in the magnetic layer 56. The underlayer 53 is preferably deposited above room temperature and less than approximately 240° C. to a thickness of approximately 1 to approximately 15 nm, for example. An optimum deposition temperature may differ depending on the substrate material. For a TiAl-on-glass substrate, good results were obtained for a deposition temperature Ts of approximately 140 to approximately 180° C., and preferably approximately 160° C. Intermetallic grains of the underlayer 53 are expected to be small due to the large chemical binding energies.

The underlayer 53 comprised of the $L1_2$ crystalline structure material may be $Al_5CuZr_2$, $Al_5CuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$. Such materials used for the underlayer 53 have the proper crystal structure and lattice parameter to promote epitaxy with the magnetic layer 56, since a lattice parameter c of Co is c=0.406 nm.

On the other hand, the underlayer 53 comprised of the $L1_0$ crystalline structure may be γ-TiAl. This material γ-TiAl used for the underlayer 53 has the proper crystal structure and lattice parameter to promote epitaxy with the magnetic layer 56. Though γ-TiAl is FCT, the a/c ratio is close to 1 and this material grows a (111) texture which enhances the c-axis of the magnetic layer 56 to be substantially normal (perpendicular) to an in-plane direction (a film plane) of the magnetic layer 56. In this case, the underlayer 53 may be made slightly Al-rich so that the Al content is 51 to 55 at. %. The presence of too much twinning may reduce the magnetic coercivity of the magnetic layer 56. However, this slightly Al-rich composition range of the underlayer 53 reduces twinning which is very common for FCC materials.

In either case where the underlayer 53 is comprised of the $L1_2$ or $L1_0$ crystalline structure, the underlayer 53 may be alloyed with at least one element selected from a group of B, Cr, Hf, Mo, Mn, Ta, Ti, V, Zr or alloys thereof. In this case, it becomes possible to promote smaller grain sizes and to reduce stress due to better lattice matching in the magnetic layer 56 by the alloying of such elements.

Furthermore, the underlayer 53 may be made essentially of tetragonal $Al_3Ti$ which is alloyed with an element selected from a group of Ni, Cu, Cr, Mn, Zn, Fe, Co, Ag, Pd, Pt, Au and Rh which make the $L1_0$ crystalline structure into the $L1_2$ crystalline structure. Alloying the tetragonal $Al_3Ti$ with the above elements transforms the $L1_0$ crystalline structure into the $L1_2$ crystalline structure, which makes the crystallographic planes such as (100), (010) and (001) have similar dimensions which provide a more uniform lattice for the magnetic layer 56 to grow on or for the adhesive layer 54 to grow on.

In this embodiment, the underlayer 53 has a lattice parameter a which satisfies 3.9 Å≦a≦4.3 Å. This range of the lattice parameter a matches that of the magnetic layer 56, to better promote epitaxy, and the c-axis of the magnetic layer 56 becomes substantially normal (perpendicular) to the in-plane direction of the magnetic layer 56. Further, the underlayer 53 preferably has a thickness in a range of approximately 10 to 40 nm.

The adhesive layer 54 improves the magnetic layer anisotropy of the magnetic layer 56, by improving the adhesion between the underlayer 53 and the magnetic layer 56. The adhesive layer 54 is made of a Cr—M alloy having a BCC crystal structure with a thickness of approximately 1 to approximately 15 nm, where M is an element selected from a group of B, Fe, Mn, Mo, Ti, V and W. Such materials used for the adhesive layer 55 has the proper lattice parameter to promote epitaxy with the magnetic layer 56. In addition, Cr adheres very well to various kinds of materials such that the Cr—M alloy makes a good buffer layer between the underlayer 53 and the magnetic layer 56.

The intermediate layer 55 made of the CoCr-based alloy having the HCP crystal structure is formed to a thickness of approximately 1 to approximately 15 nm, and is used to promote epitaxy and to narrow the grain size distribution of the magnetic layer 56. When a CoCr-based magnetic layer having a HCP crystal structure is grown directly on a Cr-based layer having the BCC crystal structure, a portion of the magnetic layer in contact with this Cr-based layer having the BCC crystal structure is adversely affected due to the lattice mismatch and/or Cr diffusion. In this case, the magnetic anisotropy as well as the total magnetization of the magnetic layer are reduced. On the other hand, the use of the non-magnetic CoCr-based alloy having the HCP crystal structure for the intermediate layer 55 prevents such undesirable effects on the magnetic layer 56. As a result, it is possible to increase the magnetic anisotropy and the coercivity of the magnetic layer 56, and also improve the orientation substantially normal (perpendicular) to the in-plane direction of the magnetic layer 56. The full magnetization of the magnetic layer 56 is also obtainable and the so-called "dead layer" portion is minimized. Moreover, the formation of smaller grains at the interface portion of the magnetic layer 56 is reduced.

The magnetic layer 56 may be made of Co or a Co-based alloy which includes a CoCrPt—X alloy, with a thickness of approximately 5 to approximately 30 nm, where X is an element selected from a group of B, Cu, Mo, Ta, W and alloys thereof. The magnetic layer 56 is preferably deposited at a temperature of approximately 200° C. to enhance Cr segregation. A two-step heating process may be employed to optimize the (111) texture of the underlayer 53 and the Cr segregation in the magnetic layer 56. The Co (0002) texture of the magnetic layer 56 is promoted by the (111) texture of the underlayer 53.

The C or DLC overlayer 57 protects the magnetic recording medium when in contact with a head. This overlayer 57 also protects the magnetic layer 56 from corrosion.

An ordered FCC $L1_2$ crystalline structure which may be used for the underlayer 53 is the same as the crystalline structure shown in FIG. 2 described above. However, in order for the lattice parameter of the underlayer 54 to substantially match that of a Cr or Cr-based magnetic layer having the HCP crystal structure, the lattice parameter of the underlayer 54 has to be approximately 4.1 Å.

Most materials having the $L1_2$ crystalline structure with the proper lattice parameter that will substantially match that of the Cr or Cr-based magnetic layer having the HCP crystal structure are Al-based alloys, as shown in FIG. 3.

On the other hand, an ordered FCT $L1_0$ crystalline structure which may be used for the underlayer 53 is the same as the crystalline structure shown in FIG. 4 described above. For example, the crystalline structure shown in FIG. 4 belongs to γ-TiAl which is tetragonal, but the lattice parameters a and c are a=0.4005 nm and c=0.407 nm which are not very different from those of the magnetic layer 56, and the ratio a/c is close to 1. Hence, it may be seen that γ-TiAl is suited for use as the underlayer 53. Doping γ-TiAl with other elements affects the electronic structure which reduces tetragonality.

Figure 13:
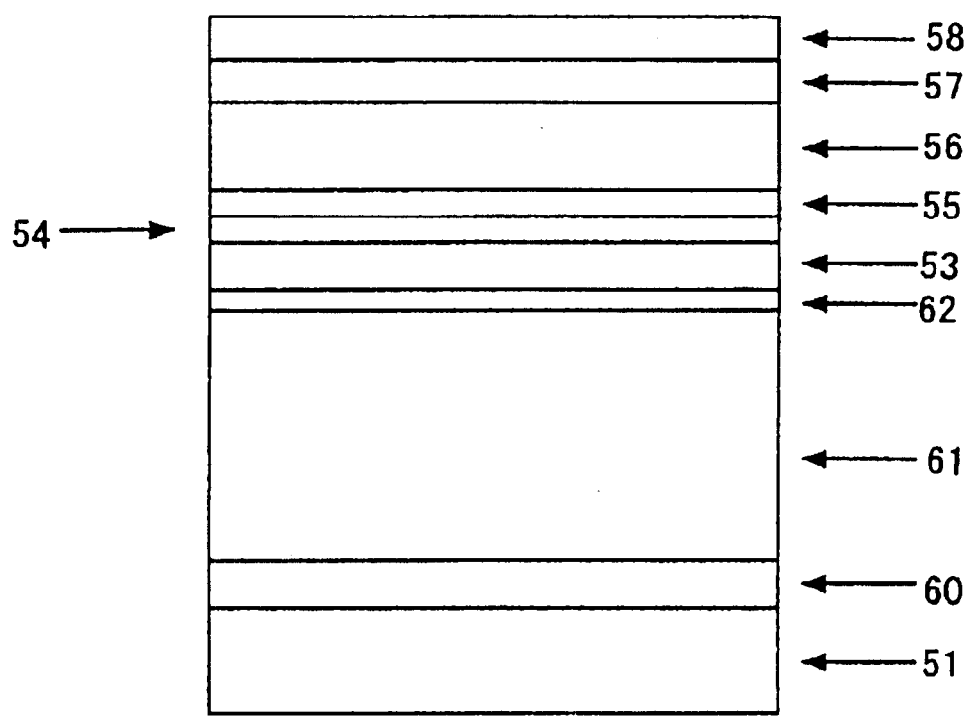
FIG. 13 is a cross sectional view showing an important part of a sixth embodiment of the magnetic recording medium according to the present invention.

FIG. 13 is a cross sectional view showing an important part of a sixth embodiment of the magnetic recording medium according to the present invention. In this sixth embodiment, the present invention is applied to a perpendicular magnetic recording medium. In FIG. 13, those parts which are the same as those corresponding parts in FIG. 12 are designated by the same reference numerals, and a description thereof will be omitted. This sixth embodiment of the magnetic recording medium is produced by a second embodiment of the method of producing the magnetic recording medium according to the present invention.

The magnetic recording medium shown in FIG. 13 includes an adhesive layer 60 on the substrate 51, a soft magnetic layer 61 on the adhesive layer 60, and a seed layer 62 on the soft magnetic layer 61. The underlayer 53 is provided on the seed layer 62. In other words, in this embodiment, the present invention is applied to the perpendicular magnetic recording medium having the double magnetic layer structure. The underlayer 53 preferably has a thickness in a range of approximately 5 to 10 nm.

The adhesive layer 60 is made of a Cr-based alloy or the like, and is deposited to a thickness of approximately 1 to approximately 5 nm.

The soft magnetic layer 61 is made of an amorphous or nanocrystalline soft magnetic material, and is deposited to a thickness of approximately 100 nm or greater. The amorphous or nanocrystalline soft magnetic material promotes small grains of the seed layer 62 and consequently of the magnetic layer 56. The double magnetic layer structure enables the use of a single-pole head and a high field compared to the single magnetic layer structure of the first embodiment with a ring head. However, the soft magnetic layer 61 becomes a medium noise source due to irregular magnetic domains formed therein. For this reason, it is preferable to have the easy axis of magnetization of the soft magnetic layer 61 in a direction crossing the recording track direction, that is, to have the hard axis of magnetization of the soft magnetic layer 11 parallel to the recording track direction, in order to minimize the medium noise.

The seed layer 62 is made of an amorphous or crystalline material, such as NiP and Ta, which is deposited to a thickness of approximately 1 to approximately 3 nm and subsequently oxidized. The use of the amorphous material for the seed layer 62 promotes small grain sizes of the underlayer 53, especially when the soft magnetic layer 61 is not made of an amorphous material. In addition, when NiP or Ta is used for the seed layer 62, an amorphous oxide layer can be formed on the surface of the seed layer 62 when the seed layer 62 is oxidized.

According to the fifth and sixth embodiments described above, it is possible to promote more Cr segregation in a Co-based alloy which forms the magnetic layer. Further, it is possible to reduce the medium noise by reducing the grain size and grain size distribution of the magnetic layer, and by the use of the underlayer which is made of the (111)-textured ordered intermetallic material of FCC $L1_2$ crystalline structure or FCT $L1_0$ crystalline structure which promotes a (0002) growth for the magnetic layer. Therefore, it is possible to greatly improve the medium SNR of the perpendicular magnetic recording medium.

Next, a description will be given of the results of experiments conducted by the present inventors, confirming the improved performance of the fifth and sixth embodiments described above, by referring to FIGS. 14A through 14D and FIGS. 15A through 15D. FIGS. 14A through 14D are diagrams showing a XRD spectrum of the underlayer and a magnetic layer for different underlayer thicknesses and deposition temperatures. FIGS. 15A through 15D are diagrams showing Kerr magnetization loops for a Co-based alloy on a TiAl-based alloy ground on glass at different deposition temperatures.

Figure 14A:
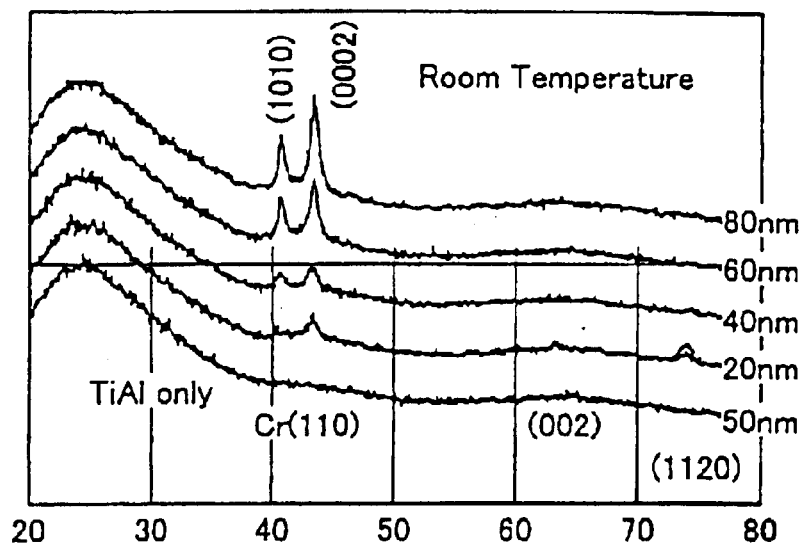
FIGS. 14A through 14D respectively are diagrams showing a XRD spectrum of an underlayer and a magnetic layer for different underlayer thicknesses and deposition temperatures.

FIG. 14A shows the XRD pattern for a 50 nm thick single TiAl layer and various perpendicular magnetic recording media having a multi-layer structure CoCrPtTaB/$Co_{63}Cr_{37}$/$Cr_{90}Mo_{10}$/TiAl deposited at room temperature on the glass substrate 51, where the CoCrPtTaB magnetic layer 56 has a thickness of 23 nm, the $Co_{63}Cr_{37}$ intermediate layer 55 has a thickness of 3 nm, and the $Cr_{90}Mo_{10}$ adhesion layer 54 has a thickness of 10 nm, and the TiAl underlayer 53 has a thickness t of t=20 to 80 nm in steps of 20 nm. The 50 nm thick single TiAl layer revealed no diffraction peak, indicating that the grain sizes are either nanocrystalline or amorphous. Similar behavior was found for NiAl layers having an average grain diameter of approximately 9 to approximately 10 nm. On the other hand, of the multi-layer structures, the CoCrPtTaB magnetic layer 56 developed (1010), (1120) and (0002) textures for t=20 nm. The (1010) and (1120) textures are for making the c-axis of the CoCrPtTaB magnetic layer 56 in-plane, while the (0002) texture is for making the c-axis of the CoCrPtTaB magnetic layer 56 substantially normal (perpendicular) to the in-plane direction. It may be regarded that the latter (0002) texture (2θ~43°) is due to the (110) texture of the $Cr_{90}Mo_{10}$ adhesion layer 54. A slight (002) texture of the $Cr_{90}Mo_{10}$ adhesion layer 54 was also observed indicating that the $Cr_{90}Mo_{10}$ adhesion layer 54 is riot amorphous. As the thickness of the TiAl underlayer 53 increased, the (1010) and (0002) textures improved.

Figure 14B:
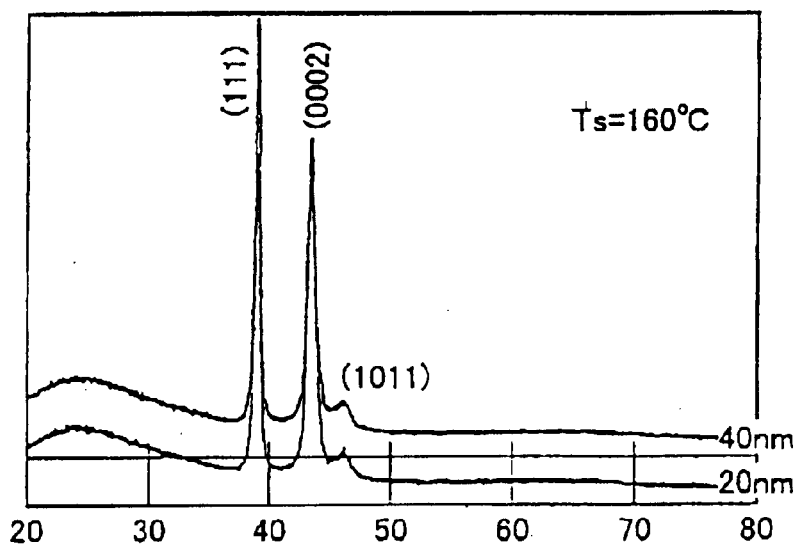

FIG. 14B shows the XRD pattern for the various perpendicular magnetic recording media having the above multi-layer structure CoCrPtTaB/$Co_{63}Cr_{37}$/$Cr_{90}Mo_{10}$/TiAl deposited at the temperature Ts of 160° C. on the glass substrate 51. The TiAl underlayer 53 has the thickness t of t=20 nm and t=40 nm. The TiAl underlayer 53 revealed a very intense (111) texture even at the thickness t of t=20 nm, which leads to an intense peak at the (0002) texture of the CoCrPtTaB magnetic layer 56. A Co (1011) texture also developed, but was dominated by the peak at the (0002) texture.

Figure 14C:
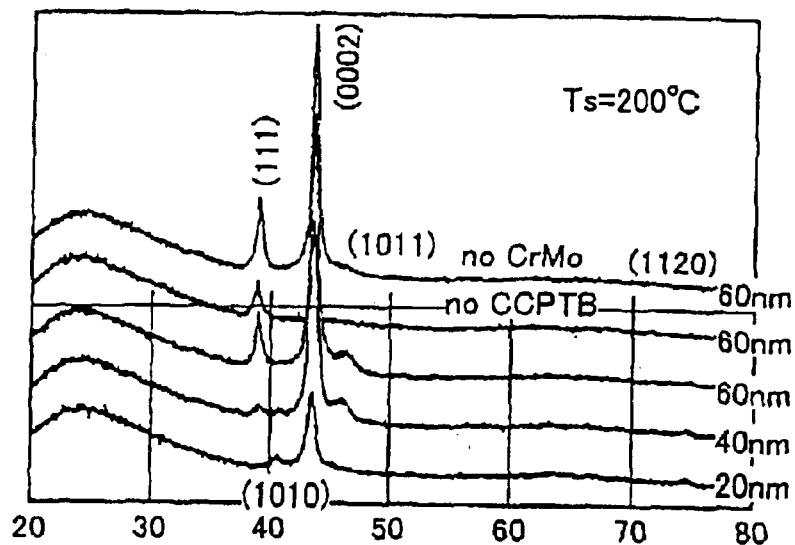

FIG. 14C shows the XRD pattern for the various perpendicular magnetic recording media having the above multi-layer structure CoCrPtTaB/$Co_{63}Cr_{37}$/$Cr_{90}Mo_{10}$/TiAl deposited at the temperature Ts of 200° C. on the glass substrate 51. The TiAl underlayer 53 has the thickness t of t=20 to 60 nm in steps of 20 nm. In addition, a case where no CoCrPtTaB magnetic layer 56 is provided and a case where no $Cr_{90}Mo_{10}$ adhesion layer 54 is provided are also shown for t=60 nm. The peak of the (111) texture of the TiAl underlayer 53 and the Cr (111) texture appeared only at the thickness t of t=40 nm, but the Co (0002) texture was already present. A further increase in the thickness t increased the intensity of the peak-s of the (111) texture and the (0002) texture. For the thickness t of t=60 nm, a peak of the (1011) texture was less intense when no $Cr_{90}Mo_{10}$ adhesion layer 54 was provided between the TiAl underlayer 53 and the $Co_{63}Cr_{37}$ intermediate layer 55.

Figure 14D:
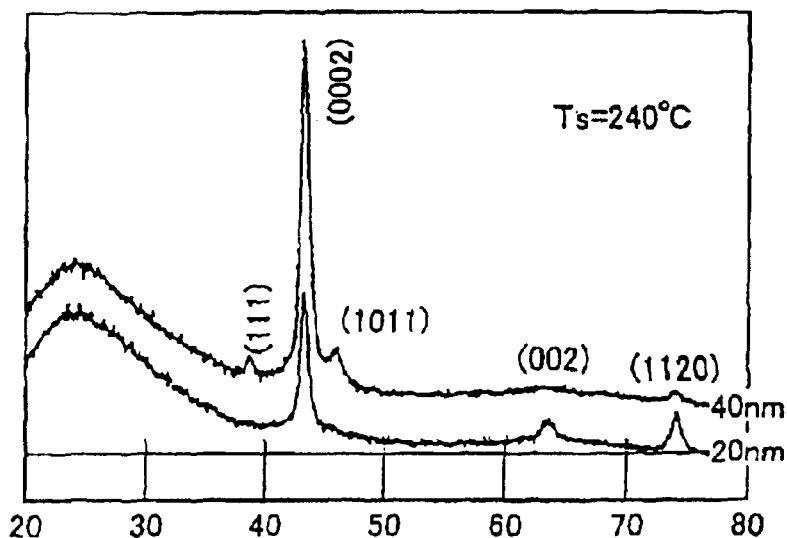

FIG. 14D shows the XRD pattern for the various perpendicular magnetic recording media having the above multi-layer structure CoCrPtTaB/$Co_{63}Cr_{37}$/$Cr_{90}Mo_{10}$/TiAl deposited at the temperature Ts of 240° C. on the glass substrate 51. The TiAl underlayer 53 has the thickness t of t=20 nm and t=40 nm. In this case, the increase of the temperature Ts lead to a suppression of the peak of the (111) texture of the TiAl layer 53 especially at small values for the thickness t. In addition, some of the c-axis of the CoCrPtTaB magnetic layer 56 was in-plane for t=20 to 40 nm.

Figure 15A:
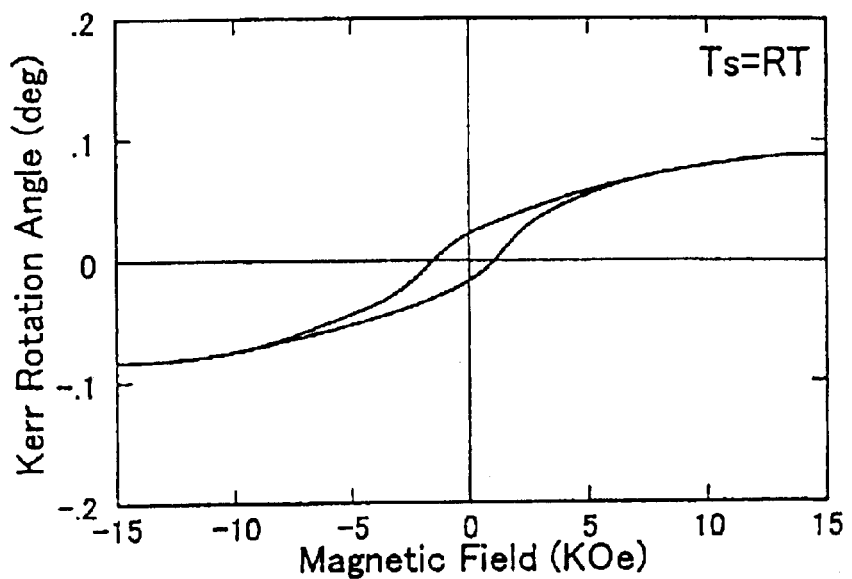
FIGS. 15A through 15D respectively are diagrams showing Kerr magnetization loops for a Co-based alloy on a TiAl-based alloy ground on glass at different deposition temperatures.
Figure 15B:
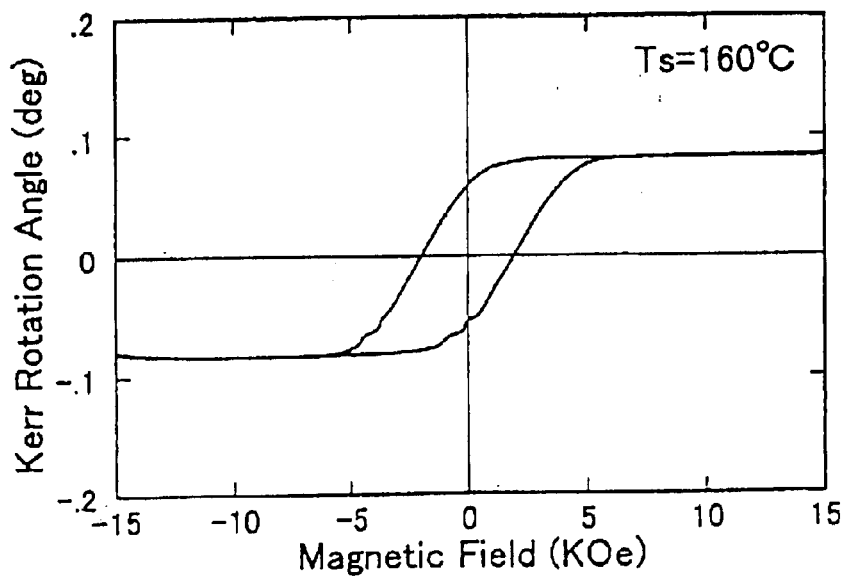
Figure 15C:
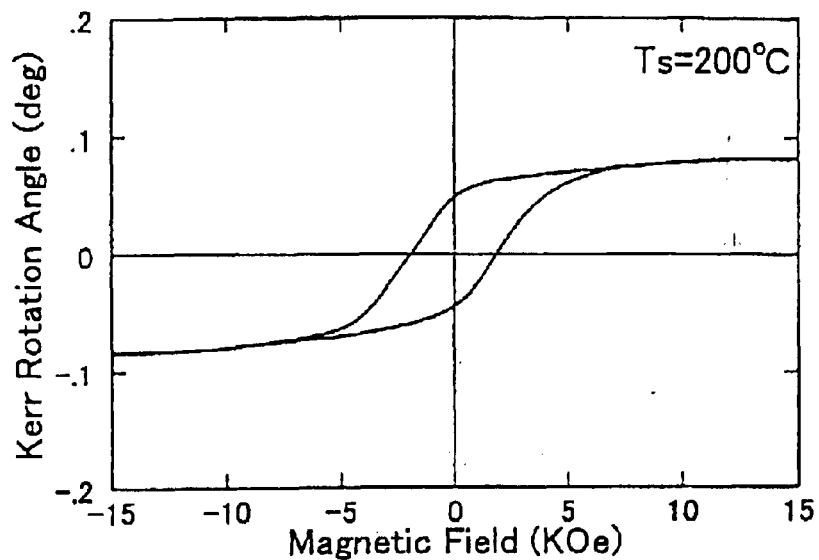
Figure 15D:
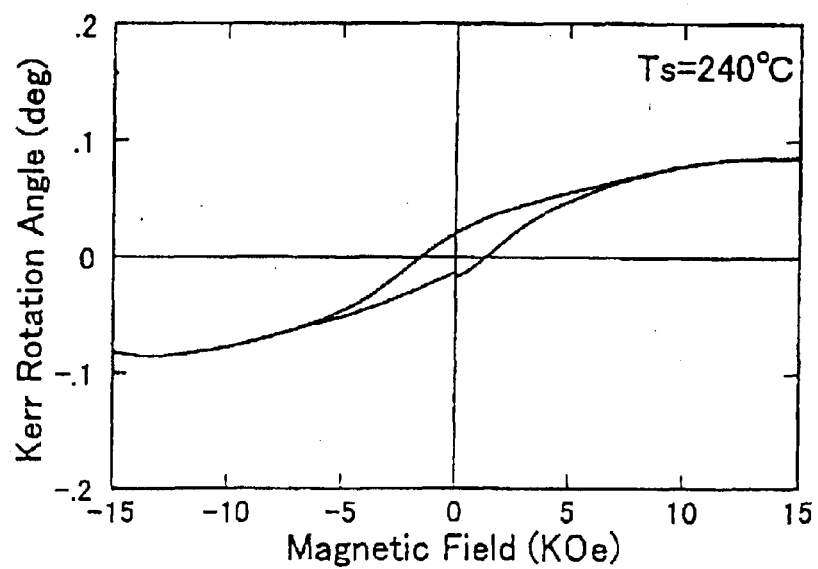

FIGS. 15A, 15B, 15C and 15D respectively show the Kerr magnetization loops, that is, the perpendicular hysteresis loops, for the various perpendicular magnetic recording media shown in FIGS. 14A, 14B, 14C and 14D for the thickness t of t=20 nm of the TiAl underlayer 53. It was confirmed that the perpendicular magnetic recording medium shown in FIG. 15B shows the largest coercivity in the direction normal (perpendicular) to the in-plane direction of the CoCrPtTaB magnetic layer 56.

Therefore, it was confirmed that the orientation of the magnetic layer 56 is controllable by simply varying the thickness t and the deposition temperature Ts of the underlayer 53. It was found desirable that the deposition temperature Ts is approximately 140 to approximately 180° C., and preferably approximately 160° C.

Next, a description will be given of a second embodiment of the magnetic storage apparatus according to the present invention. A cross sectional view and a plan view of an important part of this second embodiment of the magnetic storage apparatus respectively are the same as the cross sectional view shown in FIG. 10 and the plan view shown in FIG. 11 of the first embodiment of the magnetic storage apparatus described above.

This second embodiment of the magnetic storage apparatus is characterized by the magnetic recording media 16. Each magnetic recording medium 16 has the structure of the fifth or sixth embodiment of the magnetic recording medium described above in conjunction with FIGS. 12 through 15D. Of course, the number of magnetic recording media 16 is not limited to three, and only one, two or four or more magnetic recording media 16 may be provided.

The basic construction of the magnetic storage apparatus is not limited to that shown in FIGS. 10 and 11. In addition, the perpendicular magnetic recording medium used in the present invention is not limited to a magnetic disk.

Further, the present invention is not limited to these embodiments, but various variations and modifications may be made without departing from the scope of the present invention.

What is claimed is:

1. A perpendicular magnetic recording medium comprising:
    a substrate;
    a magnetic layer made of Co or Co alloy;
    an underlayer disposed between said substrate and said magnetic layer; and
    a soft magnetic layer, made of an amorphous or nanocrystalline soft magnetic material, disposed between said substrate and said underlayer,
    said underlayer being made of an ordered intermetallic material of FCC $L1_2$ or FCT $L1_0$ crystalline structure, so that c-axis of said magnetic layer is aligned in a direction substantially perpendicular to an in-plane direction of said magnetic layer.

2. The perpendicular magnetic recording medium as claimed in claim 1, wherein said underlayer having the FCC $L1_2$ crystalline structure is selected from a group consisting of $Al_5CuZr_2$, $Al_5CuHf_2$, $(AlCr)_3Ti$, $Al_{67}Cr_8Ti_{25}$, $Al_5NiZr_2$, $Al_5CuTi_2$, $Al_5NiNb_2$, $Al_{30}Dy_7Hf_3$, $Al_{30}Dy_7Zr_3$, $Al_3Er$, $Al_{15}HfHo_4$, and $Al_{60}Hf_7Tb_{13}$.

3. The perpendicular magnetic recording medium as claimed in claim 1, wherein said underlayer having the FCT $L1_0$ crystalline structure is γ-TiAl.

4. The perpendicular magnetic recording medium as claimed in claim 1, wherein said underlayer is alloyed with at least one element selected from a group consisting of B, Cr, Hf, Mo, Mn, Ta, Ti, V, Zr or alloys thereof.

5. The perpendicular magnetic recording medium as claimed in claim 1, wherein said underlayer is made of tetragonal $Al_3Ti$ which is alloyed with an element selected from a group consisting of Ni, Cu, Cr, Mn, Zn, Fe, Co, Ag, Pd, Pt, Au and Rh which make the FCT $L1_0$ crystalline structure into a FCC $L1_2$ crystalline structure.

6. The perpendicular magnetic recording medium as claimed in claim 1, wherein said underlayer has a lattice parameter a which satisfies 3.9 Å≦a≦4.3 Å.

7. The perpendicular magnetic recording medium as claimed in claim 1, wherein said underlayer is made of a (111)-textured ordered intermetallic material of FCC $L1_2$ or FCT $L1_0$ crystalline structure.

8. The perpendicular magnetic recording medium as claimed in claim wherein said soft magnetic layer has a hard axis of magnetization parallel to a recording track direction.

9. The perpendicular magnetic recording medium as claimed in claim 1, further comprising:
    a seed layer, made of an amorphous or nanocrystalline soft magnetic material, disposed between said soft magnetic layer and said underlayer.

10. The perpendicular magnetic recording medium as claimed in claim 1, further comprising:
    an intermediate layer, made of a CoCr-based alloy having a HCP crystal structure, disposed between said underlayer and said magnetic layer.

11. A magnetic storage apparatus comprising:
    a head; and
    at least one perpendicular magnetic recording medium which includes a substrate, a magnetic layer made of Co or a Co-based alloy, an underlayer disposed between the substrate and the magnetic layer, and a soft magnetic layer, made of an amorphous or nanocrystalline soft magnetic material, disposed between the substrate and the underlayer,
    said underlayer being made of an ordered intermetallic material of FCC $L1_2$ crystalline structure or FCT $L1_0$ crystalline structure on the substrate, so that c-axis of the magnetic layer is aligned in a direction substantially perpendicular to an in-plane direction of said magnetic layer.

12. The magnetic storage apparatus as claimed in claim 11, wherein said underlayer is made of a (111)-textured ordered intermetallic material of FCC $L1_2$ or FCT $L1_0$ crystalline structure.

13. The magnetic storage apparatus as claimed in claim 11, wherein said soft magnetic layer has a hard axis of magnetization parallel to a recording track direction.

* * * * *

UNITED STATES PATENT AND TRADEMARK OFFICE
CERTIFICATE OF CORRECTION

PATENT NO.   : 6,828,047 B2
DATED        : December 7, 2004
INVENTOR(S)  : Abarra et al.

It is certified that error appears in the above-identified patent and that said Letters Patent is hereby corrected as shown below:

<u>Column 14,</u>
Line 17, delete "claim wherein" and insert -- claim 1 wherein --.

Signed and Sealed this

Twenty-sixth Day of April, 2005

JON W. DUDAS
*Director of the United States Patent and Trademark Office*